United States Patent
Teba et al.

(10) Patent No.: US 11,320,121 B2
(45) Date of Patent: May 3, 2022

(54) METHOD FOR ASSEMBLING AN ADJUSTABLE AUTOMOTIVE LUMINOUS DEVICE

(71) Applicant: Valeo Iluminacion S.A., Martos (ES)

(72) Inventors: Daniel Teba, Martos (ES);
Juan-Antonio Rubia, Martos (ES);
Beatriz Rama, Martos (ES);
Alfonso-Manuel Guzman, Martos (ES); Francisco Martinez, Martos (ES); Manuel-Jesus Medina, Martos (ES)

(73) Assignee: Valeo Iluminacion S.A., Martos (ES)

( * ) Notice: Subject to any disclaimer, the term of this patent is extended or adjusted under 35 U.S.C. 154(b) by 405 days.

(21) Appl. No.: 16/527,644

(22) Filed: Jul. 31, 2019

(65) Prior Publication Data
US 2020/0041104 A1    Feb. 6, 2020

(30) Foreign Application Priority Data

Jul. 31, 2018  (EP) .................................. 18382575

(51) Int. Cl.
*B60Q 1/04*    (2006.01)
*F21V 19/00*    (2006.01)
(Continued)

(52) U.S. Cl.
CPC .......... *F21V 19/0005* (2013.01); *F21S 41/19* (2018.01); *F21V 23/06* (2013.01)

(58) Field of Classification Search
CPC .... F21V 19/0005; F21V 23/06; F21V 17/005; F21S 41/657; F21S 41/675; B60Q 1/045; B60Q 1/0483
See application file for complete search history.

(56) References Cited

U.S. PATENT DOCUMENTS

2009/0257819 A1    10/2009    Burton
2013/0219694 A1    8/2013    Ovenshire
(Continued)

FOREIGN PATENT DOCUMENTS

CN    204488626 U    7/2015
DE    196 07 798 A1    9/1996
(Continued)

OTHER PUBLICATIONS

European Search Report dated Nov. 20, 2018 in European Application 18 382575.1 filed on Jul. 31, 2018.

*Primary Examiner* — Ismael Negron
(74) *Attorney, Agent, or Firm* — Oblon, McClelland, Maier & Neustadt, L.L.P.

(57) ABSTRACT

The method includes a first step of providing a housing with a hollow protrusion. A second step provides an auxiliary element in the hollow protrusion. A third step provides a connector receptacle in connection with the auxiliary element. A fourth step inserts a matching connector in the connector receptacle in a detachable way, the matching connector further including guiding means. A fifth step places a luminous module including a module connector, the module connector being helped by the guiding means to be connected to the matching connector, to achieve an electric connection between the module connector and the matching connector. A final step moves the connector receptacle so that the matching connector exits from the connector receptacle.

20 Claims, 4 Drawing Sheets

(51) Int. Cl.
*F21S 41/19* (2018.01)
*F21V 23/06* (2006.01)

(56) References Cited

U.S. PATENT DOCUMENTS

2016/0047519 A1 2/2016 Shibata
2018/0119913 A1 5/2018 Shibata

FOREIGN PATENT DOCUMENTS

| | | |
|---|---|---|
| DE | 10 2015 215 696 A1 | 2/2016 |
| FR | 3 010 771 A1 | 3/2015 |
| JP | 2014-146465 A | 8/2014 |
| KR | 2002-0088136 A | 11/2002 |

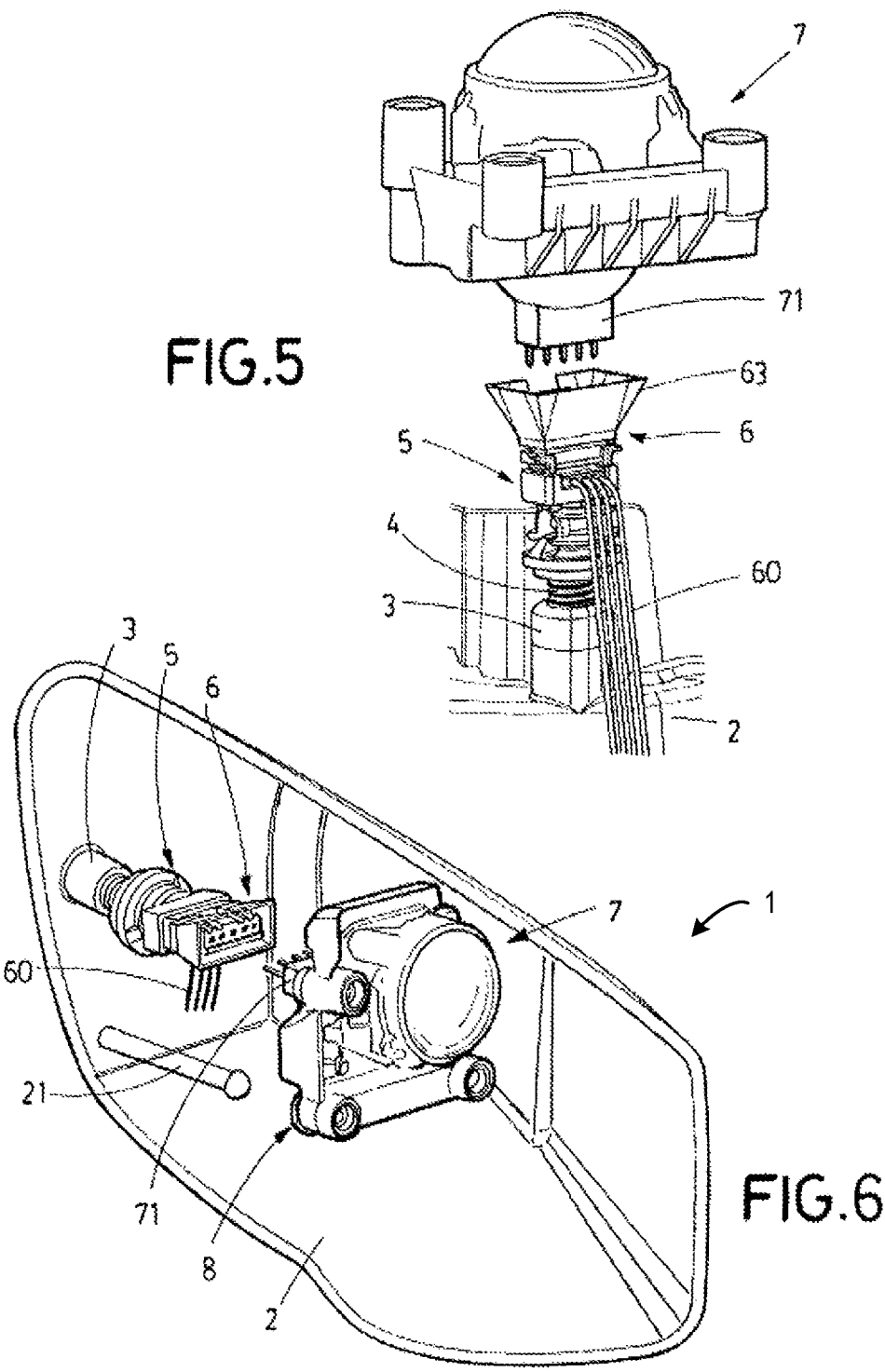

METHOD FOR ASSEMBLING AN ADJUSTABLE AUTOMOTIVE LUMINOUS DEVICE

TECHNICAL FIELD

This invention is related to the field of the manufacturing of automotive luminous devices, and more specifically to the positioning of luminous modules on a luminous device housing.

STATE OF THE ART

Vehicles luminous devices require an increasing number of electric connections to perform new functions, providing a safer and advanced performance.

A harness of wires is used to make information and electric supply reach each one of the light sources of the luminous device. This harness is distributed in different bundles throughout the housing, because luminous modules must be located in specific positions to fulfil strict regulations.

Each one of these wires bundles ends with an electrical connector, which is electrically coupled to the luminous module. However, these wires bundles are loose and, since the assembly of the luminous devices is made manually, with reduced visibility and accessibility, the final layout of these bundles after connecting the luminous module is uncertain. This may be dangerous and impact the correct operation of the luminous device.

Further, current luminous modules sometimes request freedom to rotate or pivot, so these connections cannot be excessively tight.

DESCRIPTION OF THE INVENTION

The invention provides a solution for this problem by means of method for manufacturing a luminous device according to claim 1. Preferred embodiments of the invention are defined in dependent claims.

Unless otherwise defined, all terms (including technical and scientific terms) used herein are to be interpreted as is customary in the art. It will be further understood that terms in common usage should also be interpreted as is customary in the relevant art and not in an idealised or overly formal sense unless expressly so defined herein.

In this text, the term "comprises" and its derivations (such as "comprising", etc.) should not be understood in an excluding sense, that is, these terms should not be interpreted as excluding the possibility that what is described and defined may include further elements, steps, etc.

In a first inventive aspect, the invention provides a method for manufacturing an automotive luminous device, the method comprising the steps of providing a housing with a hollow protrusion;
providing an auxiliary element in the hollow protrusion;
providing a connector receptacle in connection with the auxiliary element, so that the connector receptacle has a rotational degree of freedom with respect to the auxiliary element, but has no linear degree of freedom with respect to the auxiliary element;
inserting a matching connector in the connector receptacle in a detachable way, the matching connector further comprising guiding means;
placing a luminous module comprising a module connector, the module connector being helped by the guiding means to be connected to the matching connector, thus achieving an electric connection between the module connector and the matching connector;
moving the connector receptacle so that the matching connector exits from the connector receptacle.

The connector receptacle is connected to the auxiliary element in such a way that the connector receptacle may rotate with respect to the auxiliary element, but may not displace linearly, unless a high separation force is applied. As a result, when the matching connector is inserted in the connector receptacle, the guiding means of the matching connector have a rotational degree of freedom with respect to the housing, so that these guiding means adapt to the position of the module connector while the lighting module approaches the housing for its assembly.

This method allows a semiautomatic electrical connection between the lighting module and the matching connection, which is previously pre-positioned to the housing in an earlier manufacturing step. The lighting module is safely connected and then the auxiliary elements used to achieve this connection are moved away so that the module connector and the matching connector are freed.

In some particular embodiments, the luminous module further comprises a mechanical connector which is connected to the housing while the module connector is connected to the matching connector.

This simultaneous connection is particularly advantageous, since in the same step as the mechanical connection is achieved, electrical connection is also finished, and the movement of the auxiliary elements frees the lighting module so that the module installation is completed.

In some particular embodiments, the luminous module further comprises a mechanical connector which is connected to an aiming system of the housing while the module connector is connected to the matching connector.

The use of an aiming system is particularly advantageous, since it may locate the connection point far from the housing, in a location where this connection may be more convenient for the manufacturing process.

In some particular embodiments, the hollow protrusion is internally threaded, and the step of moving the connector receptacle includes screwing the auxiliary element into the hollow protrusion, so that the connector receptacle moves away from the matching connector.

The auxiliary element and the connector receptacle are engaged and form an assembly which a rotational degree of freedom. As a consequence, when the auxiliary element is screwed into the hollow protrusion, the connector receptacle also moves with it, and leaves the matching connector in connection with the module connector.

In some particular embodiments, the hollow protrusion is a through hole so that it is accessible from both sides, and the step of screwing the auxiliary element is made from the side opposite from the connection between the auxiliary element and the connector receptacle.

The screwing of the auxiliary element may be performed in many ways. One of them is accessing it from a side opposite to the side where the auxiliary element is provided inside the hollow protrusion. This is a good solution, since the through hole is closed by the auxiliary element itself and this auxiliary element, despite being screwed, remains as a watertight sealing for this through hole.

In some particular embodiments, the hollow protrusion is configured to allow the displacement of the auxiliary element inside the hollow protrusion but offering resistance to the movement, so that the resistance keeps the auxiliary element in place until the step of moving the connector receptacle, when an external force overcomes the resistance and moves the auxiliary element inside the hollow protrusion so that the matching connector exits from the connector receptacle.

In these embodiments, the auxiliary element is configured to slide along the inner surface of the hollow protrusion. In a first step, the auxiliary element is merely deposited inside the hollow protrusion, and the rest of elements (the connector receptacle and the matching connector) are successively placed on it. Due to the resistive force, the auxiliary element supports these elements without moving. In a further step, the auxiliary element is forced to move further inside the hollow protrusion so that the connector receptacle disengages from the matching connector.

In some particular embodiments, the auxiliary element and the connector receptacle comprise a ball joint and a ball socket, so that the connection between the auxiliary element and the connector receptacle has a rotational degree of freedom.

The auxiliary element and the connection receptacle have a mutual engagement which allows the connector receptacle move with a rotational degree of freedom with respect to the auxiliary element, but has no linear degree of freedom. This ball joint-socket arrangement is a good option to achieve this connection. One of the auxiliary element or the connector receptacle comprises the ball joint and the other one comprises the ball socket. In preferred embodiments, the auxiliary element comprises the ball joint and the connection receptacle comprises the ball socket.

In some particular embodiments,
the matching connector comprises a first region intended to cooperate with the connector receptacle and a second region comprising the guiding means, and
the first region of the matching connector and the connector receptacle comprise a rectangular protrusion and a rectangular housing, so that the insertion between the matching connector and the connector receptacle may only be assembled and disassembled in a single direction.

This way of inserting the matching connector into the connector receptacle in a detachable way is advantageous, since after this insertion, the matching connector is safely engaged to the auxiliary element with a rotational degree of freedom, waiting for the module connector to be connected to it.

In some particular embodiments, the rectangular housing comprises a recess for connecting cables from the matching connector to pass.

The matching connector is electrically connected to the main electrical connection of the housing in a previous step. The cables that perform this connection are conducted in a controlled way from the matching connector to this main electrical connection due to the recess.

In some particular embodiments, the guiding means comprise a funnel shaped guide adapted to guide the module connector towards the matching connector.

This funnel shaped guide comprised in the matching connector helps the module connector to arrive at the matching connector while the luminous module is being installed in the housing.

BRIEF DESCRIPTION OF THE DRAWINGS

To complete the description and in order to provide for a better understanding of the invention, a set of drawings is provided. Said drawings form an integral part of the description and illustrate an embodiment of the invention, which should not be interpreted as restricting the scope of the invention, but just as an example of how the invention can be carried out. The drawings comprise the following figures:

FIG. 2 shows a second step of the method illustrated in FIG. 1a.

FIG. 5 represents a fifth step of this method.
FIG. 6 represents a farther perspective of this fifth step.

DETAILED DESCRIPTION OF THE INVENTION

Figure 1A:
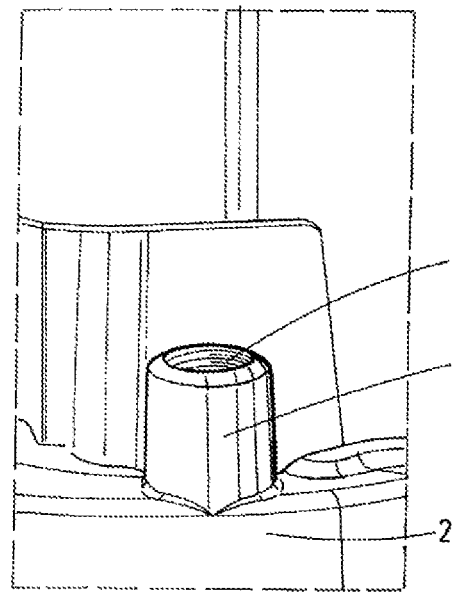
FIG. 1a shows a first step of a particular embodiment of a method for manufacturing an automotive luminous device according to the invention.

The example embodiments are described in sufficient detail to enable those of ordinary skill in the art to embody and implement the systems and processes herein described. It is important to understand that embodiments can be provided in many alternate forms and should not be construed as limited to the examples set forth herein.

Accordingly, while embodiment can be modified in various ways and take on various alternative forms, specific embodiments thereof are shown in the drawings and described in detail below as examples. There is no intent to limit to the particular forms disclosed. On the contrary, all modifications, equivalents, and alternatives falling within the scope of the appended claims should be included. Elements of the example embodiments are consistently denoted by the same reference numerals throughout the drawings and detailed description where appropriate.

FIG. 1a shows a first step of a particular embodiment of a method for assembling an automotive luminous device according to the invention.

In FIG. 1a, a housing 2 is provided with a hollow protrusion 3. The hollow protrusion 3 has some means to retain an element which is inserted in it. In FIG. 1a, this means comprise a threaded inner surface 30.

Figure 1B:
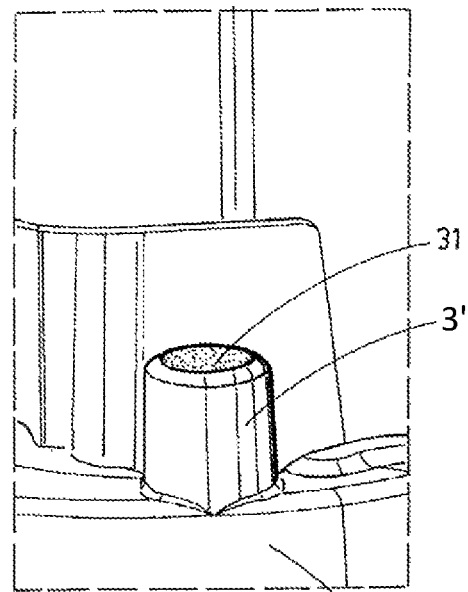
FIG. 1b shows a first step of a different embodiment of a method for manufacturing an automotive luminous device according to the invention.

FIG. 1b shows a first step of a different embodiment of a method for assembling an automotive luminous device according to the invention.

In FIG. 1b, a housing 2' is also provided with a hollow protrusion 3', and the hollow protrusion 3' has some means to retain an element which is inserted in it. However, in FIG. 1a, this means comprise a rubber inner surface 31.

Figure 2:
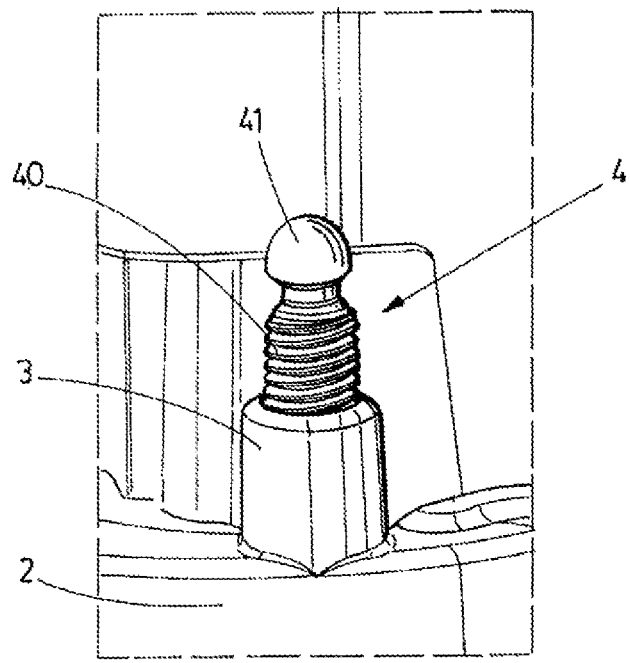

FIG. 2 shows a second step of a particular embodiment of a method for assembling an automotive luminous device according to the invention.

FIG. 2 represents a method which uses the housing 2 of FIG. 1a. In FIG. 2, an auxiliary element 4 is placed in the hollow protrusion 3. Since the hollow protrusion 3 has an inner threaded surface, the auxiliary element 4, which is intended to match this threaded surface, comprises a complementary threaded surface 40.

The auxiliary element 4 also comprises a ball joint 41, which is accessible after the auxiliary element 4 has been introduced into the hollow protrusion 3.

Figure 3:
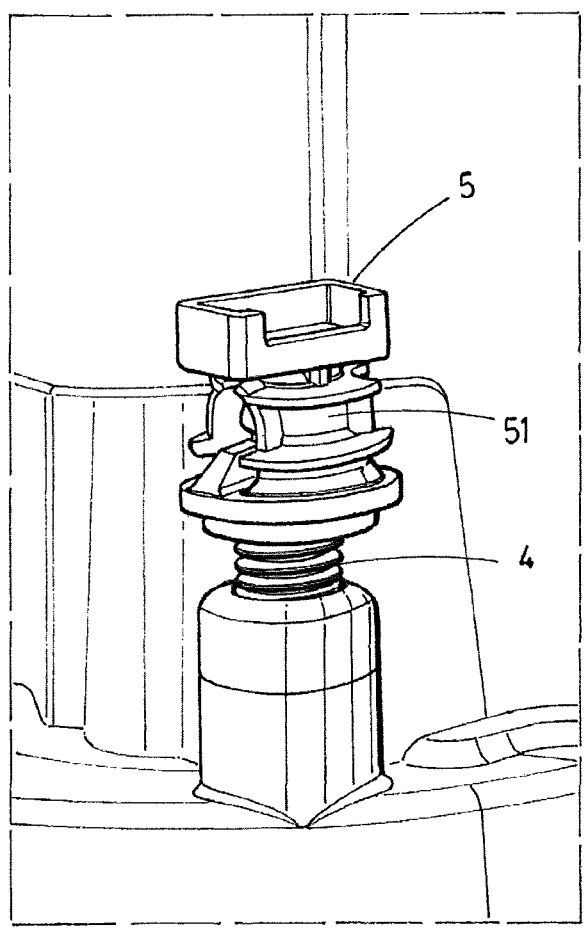
FIG. 3 represents a third step of this method.

FIG. 3 represents a third step of this method. In FIG. 3, a connector receptacle 5 is engaged to the auxiliary element 4 by means of a ball socket 51 which is connected to the ball joint 41 (covered by the ball socket 51) of the auxiliary element 4. As a consequence, the connector receptacle 5 has a rotational degree of freedom with respect to the auxiliary element 4, but has no linear degree of freedom with respect to the auxiliary element 4. As may be obvious, in different embodiments, the ball socket 51 is part of the auxiliary element 4 and the ball joint 41 is part of the connector receptacle 5.

Figure 4:
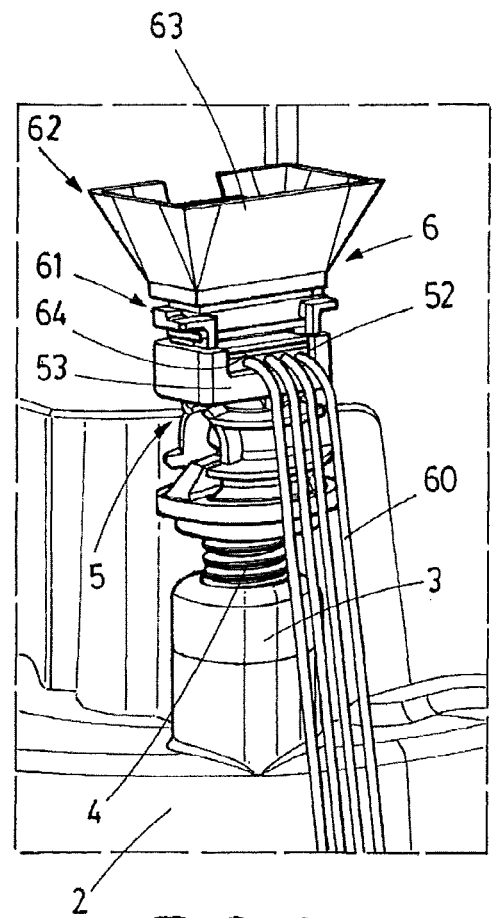
FIG. 4 represents a fourth step of this method.

FIG. 4 represents a fourth step of this method. In FIG. 4, a matching connector 6 is inserted in the connector receptacle 5. The connector receptacle 5 comprises a recess 52 so that connecting cables 60 from the matching connector 6 may pass through the recess 52 and then reach the main connector of the housing 2.

The matching connector 6 comprises a first region 61 intended to cooperate with the connector receptacle 5 and a second region 62 comprising a funnel guide 63. The first region 61 comprises a rectangular protrusion 64 and the connector receptacle 5 comprises a rectangular housing 53, so that the insertion between the matching connector 6 and the connector receptacle 5 may only be assembled and disassembled in a single direction.

The matching connector 6 is therefore inserted in the connector receptacle 5 in a detachable way, but with a single linear degree of freedom, since these elements may only be separated in the same direction of insertion. Due to this connection, the matching connector 6 has a rotational degree of freedom with respect to the auxiliary element 4, and therefore with respect to the housing 2.

FIG. 5 represents a fifth step of this method. A luminous module 7 with a module connector 71 approaches the matching connector 6. The module connector 71 is guided by the funnel guide 63 to be coupled to the matching connector 6, thus achieving an electric connection between the module connector 71 and the matching connector 6.

FIG. 6 represents a farther perspective of this fifth step, showing the automotive luminous device 1. The luminous module 7 is approaching at the same time the matching connector 6 and some aiming system 21 located in the housing 2. As a consequence, in a single coupling step, a mechanical connector 8 of the luminous module 7 is mechanically coupled to the aiming system 21 of the housing 2 and the module connector 71 is also electrically coupled to the matching connector 6, which also belongs to the housing 2. This single step is automatic and saves human intervention, while keeps the connecting cables 60 safe from being tangled or trapped, since they do not move during this assembly step.

Figure 7:
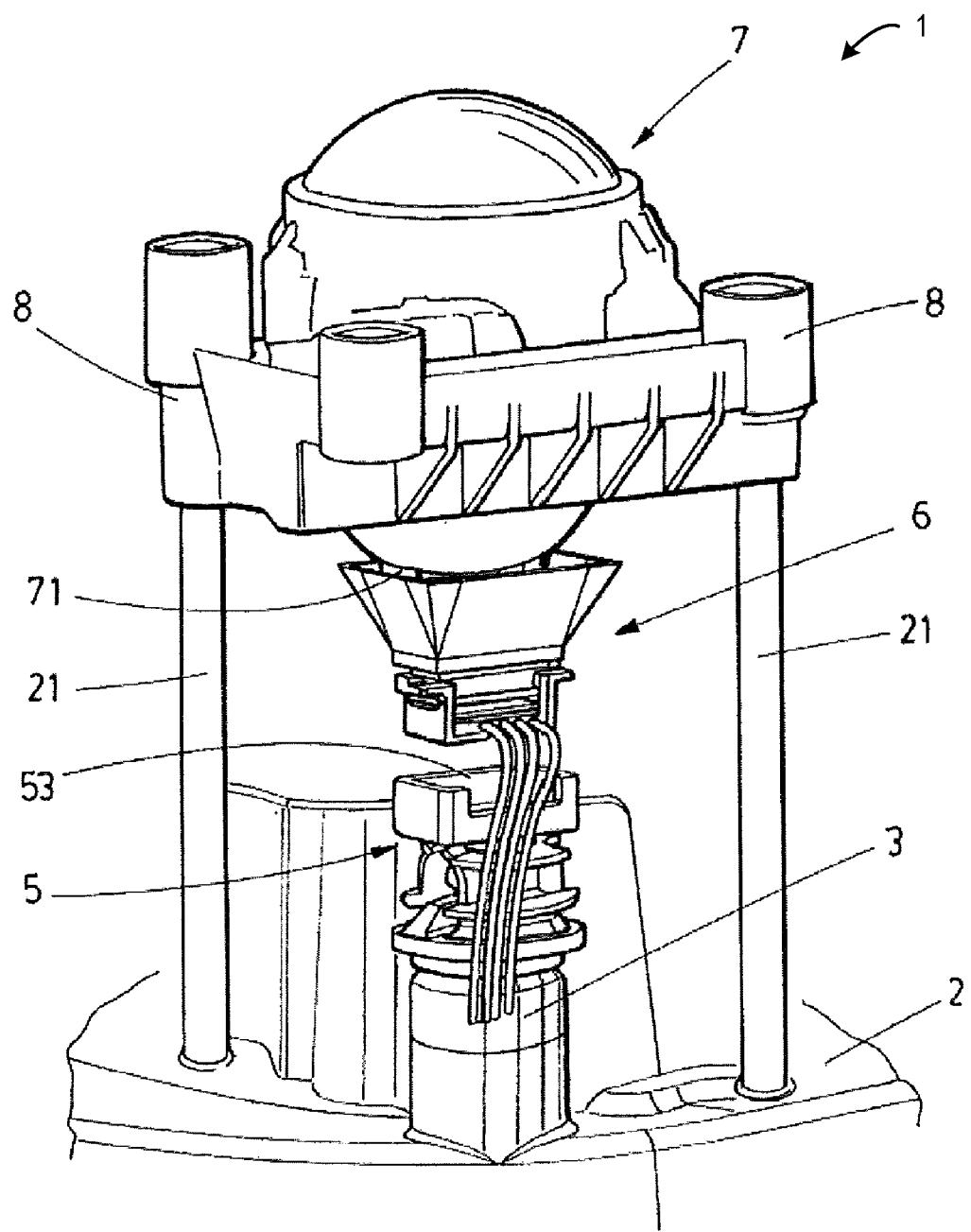
FIG. 7 represents a final step of this method.

FIG. 7 represents a final step of this method. The auxiliary element 4 is screwed into the hollow protrusion 3 (so it is not seen). As a consequence, the rectangular housing 53 of the connector receptacle 5, which is engaged to the auxiliary element 4, also descends, being disengaged from the matching connector 6, which remains coupled to the module connector 71 since the force which couples both connectors is stronger than the mere insertion of a rectangular element inside a rectangular housing. As a consequence, the luminous module 7 remains connected to the matching connector 6 and is free to be moved by the mechanical connector 8 when required, since the mechanical connector 8 is coupled to the aiming system 21 of the housing 2.

As may be seen in this figure, the hollow protrusion is a through hole so that it is accessible from both sides, and the step of screwing the auxiliary element is made from the side opposite from the connection between the auxiliary element and the connector receptacle.

In the method which is according to the embodiment shown in FIG. 1b, this final step would comprise the step of introducing the auxiliary element inside the hollow protrusion by a force which overcomes the resistance and moves the auxiliary element inside the hollow protrusion so that the matching connector exits from the connector receptacle.

The invention claimed is:

1. Method for assembling an automotive luminous device, the method comprising the steps of
providing a housing with a hollow protrusion;
providing an auxiliary element in the hollow protrusion;
providing a connector receptacle in connection with the auxiliary element, so that the connector receptacle has a rotational degree of freedom with respect to the auxiliary element, but has no linear degree of freedom with respect to the auxiliary element;
inserting a matching connector in the connector receptacle in a detachable way, the matching connector further comprising guiding means;
placing a luminous module comprising a module connector, the module connector being helped by the guiding means to be connected to the matching connector, thus achieving an electric connection between the module connector and the matching connector; and
moving the connector receptacle so that the matching connector exits from the connector receptacle.

2. Method according to claim 1, wherein the hollow protrusion is configured to allow the displacement of the auxiliary element inside the hollow protrusion but offering resistance to the movement, so that the resistance keeps the auxiliary element in place until the step of moving the connector receptacle, when an external force overcomes the resistance and moves the auxiliary element inside the hollow protrusion so that the matching connector exits from the connector receptacle.

3. Method according to claim 1, wherein the auxiliary element and the connector receptacle comprise a ball joint and a ball socket, so that the connection between the auxiliary element and the connector receptacle has a rotational degree of freedom.

4. Method according to claim 1, wherein the guiding means comprise a funnel shaped guide adapted to guide the module connector towards the matching connector.

5. Method according to claim 1, wherein the hollow protrusion is internally threaded, and the step of moving the connector receptacle includes screwing the auxiliary element into the hollow protrusion, so that the connector receptacle moves away from the matching connector.

6. Method according to claim 5, wherein the hollow protrusion is a through hole so that it is accessible from both sides, and the step of screwing the auxiliary element is made from the side opposite from the connection between the auxiliary element and the connector receptacle.

7. Method according to claim 1, wherein the matching connector comprises a first region intended to cooperate with the connector receptacle and a second region comprising the guiding means, and the first region of the matching connector and the connector receptacle comprise a rectangular protrusion and a rectangular housing, so that the insertion between the matching connector and the connector receptacle may only be assembled and disassembled in a single direction.

8. Method according to claim 7, wherein the rectangular housing comprises a recess for connecting cables from the matching connector to pass.

9. Method according to claim 1, wherein the luminous module further comprises a further mechanical connector which is connected to an aiming system of the housing while the module connector is connected to the matching connector.

10. Method according to claim 9, wherein the hollow protrusion is internally threaded, and the step of moving the connector receptacle includes screwing the auxiliary element into the hollow protrusion, so that the connector receptacle moves away from the matching connector.

11. Method according to claim 9 wherein the hollow protrusion is configured to allow the displacement of the auxiliary element inside the hollow protrusion but offering resistance to the movement, so that the resistance keeps the auxiliary element in place until the step of moving the connector receptacle, when an external force overcomes the resistance and moves the auxiliary element inside the hollow protrusion so that the matching connector exits from the connector receptacle.

12. Method according to claim 9 wherein the auxiliary element and the connector receptacle comprise a ball joint and a ball socket, so that the connection between the auxiliary element and the connector receptacle has a rotational degree of freedom.

13. Method according to claim 9, wherein the matching connector comprises a first region intended to cooperate with the connector receptacle and a second region comprising the guiding means, and the first region of the matching connector and the connector receptacle comprise a rectangular protrusion and a rectangular housing, so that the insertion between the matching connector and the connector receptacle may only be assembled and disassembled in a single direction.

14. Method according to claim 1, wherein the luminous module further comprises a mechanical connector which is connected to the housing while the module connector is connected to the matching connector.

15. Method according to claim 14, wherein the luminous module further comprises a further mechanical connector which is connected to an aiming system of the housing while the module connector is connected to the matching connector.

16. Method according to claim 14, wherein the hollow protrusion is internally threaded, and the step of moving the connector receptacle includes screwing the auxiliary element into the hollow protrusion, so that the connector receptacle moves away from the matching connector.

17. Method according to claim 14, wherein the hollow protrusion is configured to allow the displacement of the auxiliary element inside the hollow protrusion but offering resistance to the movement, so that the resistance keeps the auxiliary element in place until the step of moving the connector receptacle, when an external force overcomes the resistance and moves the auxiliary element inside the hollow protrusion so that the matching connector exits from the connector receptacle.

18. Method according to claim 14, wherein the auxiliary element and the connector receptacle comprise a ball joint and a ball socket, so that the connection between the auxiliary element and the connector receptacle has a rotational degree of freedom.

19. Method according to claim 14, wherein the matching connector comprises a first region intended to cooperate with the connector receptacle and a second region comprising the guiding means, and the first region of the matching connector and the connector receptacle comprise a rectangular protrusion and a rectangular housing, so that the insertion between the matching connector and the connector receptacle may only be assembled and disassembled in a single direction.

20. Method according to claim 14, wherein the guiding means comprise a funnel shaped guide adapted to guide the module connector towards the matching connector.

\* \* \* \* \*